(12) United States Patent
Lee et al.

(10) Patent No.: US 9,990,094 B2
(45) Date of Patent: Jun. 5, 2018

(54) TRANSPARENT COMPOSITE SUBSTRATE, PREPARATION METHOD THEREOF AND TOUCH PANEL

(71) Applicant: TPK Touch Solutions (Xiamen) Inc., Xiamen (CN)

(72) Inventors: Yuh-Wen Lee, Hsinchu (TW); Hsiang-Lung Hsia, Changhua (TW); Quanfen Dai, Longyan (CN); Dongmei Ye, Xiamen (CN)

(*) Notice: Subject to any disclaimer, the term of this patent is extended or adjusted under 35 U.S.C. 154(b) by 10 days.

(21) Appl. No.: 14/918,530

(22) Filed: Oct. 20, 2015

(65) Prior Publication Data

US 2016/0109982 A1 Apr. 21, 2016

(30) Foreign Application Priority Data

Oct. 21, 2014 (CN) .......................... 2014 1 0562579

(51) Int. Cl.
| | |
|---|---|
| *G06F 3/044* | (2006.01) |
| *G06F 3/041* | (2006.01) |
| *B32B 9/00* | (2006.01) |
| *B32B 37/06* | (2006.01) |
| *B32B 7/10* | (2006.01) |
| *B32B 37/14* | (2006.01) |
| *B32B 17/06* | (2006.01) |

(52) U.S. Cl.
CPC ............... *G06F 3/044* (2013.01); *B32B 7/10* (2013.01); *B32B 9/005* (2013.01); *B32B 17/06* (2013.01); *B32B 37/06* (2013.01); *B32B 37/14* (2013.01); *G06F 3/041* (2013.01); *B32B 2255/20* (2013.01); *B32B 2307/412* (2013.01); *B32B 2457/208* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 8,500,292 | B2 * | 8/2013 | Lo ..................... | G02F 1/133308 362/627 |
| 8,980,115 | B2 * | 3/2015 | Bibl ........................ | B32B 3/02 216/23 |
| 9,369,553 | B2 * | 6/2016 | Zahler ................. | H04M 1/0266 |
| 2004/0041504 | A1 * | 3/2004 | Ozolins ................. | G02F 1/1333 313/110 |
| 2005/0162583 | A1 * | 7/2005 | Ozolins ................. | G02F 1/1333 349/58 |
| 2006/0257753 | A1 * | 11/2006 | Kim ........................ | B82Y 10/00 430/5 |
| 2007/0115207 | A1 * | 5/2007 | Jang .................. | G02F 1/133308 345/32 |
| 2007/0115268 | A1 * | 5/2007 | Jang .................. | G02F 1/133308 345/183 |
| 2007/0115269 | A1 * | 5/2007 | Jang .................. | G02F 1/133308 345/183 |
| 2008/0074028 | A1 * | 3/2008 | Ozolins ................. | G02F 1/1333 313/479 |
| 2010/0039406 | A1 * | 2/2010 | Lee ..................... | G02F 1/13338 345/174 |

(Continued)

*Primary Examiner* — Patrick F Marinelli (57) ABSTRACT

A transparent composite substrate includes a first transparent substrate, a second transparent substrate, and a binding layer bonding the first transparent substrate and the second transparent substrate with a bond therebetween.

11 Claims, 5 Drawing Sheets

(56) References Cited

U.S. PATENT DOCUMENTS

| | | | |
|---|---|---|---|
| 2011/0039094 A1* | 2/2011 | Sivasankar | C03C 27/10 428/332 |
| 2011/0075065 A1* | 3/2011 | Ozolins | G02F 1/1333 349/58 |
| 2011/0235364 A1* | 9/2011 | Lo | G02F 1/133308 362/611 |
| 2011/0256385 A1* | 10/2011 | Matsuzaki | C03C 17/42 428/336 |
| 2012/0118628 A1* | 5/2012 | Pakula | G06F 1/1626 174/520 |
| 2012/0326576 A1* | 12/2012 | Ozolins | G02F 1/1333 312/7.2 |
| 2013/0071601 A1* | 3/2013 | Bibl | B32B 3/02 428/67 |
| 2013/0163117 A1* | 6/2013 | Bhatia | G11B 5/72 360/110 |
| 2013/0218513 A1* | 8/2013 | Hasson | B01L 7/525 702/133 |
| 2014/0133074 A1* | 5/2014 | Zahler | H04M 1/0266 361/679.01 |
| 2014/0139978 A1* | 5/2014 | Kwong | H04M 1/0202 361/679.01 |
| 2014/0181750 A1* | 6/2014 | Fujiwara | G06F 3/04817 715/835 |
| 2014/0240620 A1* | 8/2014 | Chiu | G06F 1/1626 349/12 |
| 2014/0247543 A1* | 9/2014 | Ozolins | G02F 1/1333 361/679.01 |
| 2014/0267099 A1* | 9/2014 | Blair | G06F 1/1692 345/173 |
| 2015/0070826 A1* | 3/2015 | Montevirgen | G06F 1/1637 361/679.26 |
| 2015/0085432 A1* | 3/2015 | Memering | G06F 1/1626 361/679.01 |
| 2015/0129401 A1* | 5/2015 | Sanford | G06F 1/1626 200/294 |
| 2015/0165562 A1* | 6/2015 | Marjanovic | C03B 33/0222 428/64.1 |
| 2015/0342066 A1* | 11/2015 | Motohashi | H05K 5/0217 361/679.01 |
| 2015/0362960 A1* | 12/2015 | Chang | G06F 3/044 345/173 |
| 2016/0034078 A1* | 2/2016 | Ryu | G06F 3/047 345/174 |
| 2016/0092015 A1* | 3/2016 | Al-Dahle | G06F 3/044 345/174 |
| 2016/0100255 A1* | 4/2016 | Kanemaki | H04R 17/00 381/190 |
| 2016/0109974 A1* | 4/2016 | Lee | B32B 9/04 345/173 |
| 2016/0109982 A1* | 4/2016 | Lee | G06F 3/041 345/173 |
| 2016/0126033 A1* | 5/2016 | Hibino | H01H 13/88 361/679.01 |
| 2016/0132142 A1* | 5/2016 | Chiu | G06F 1/1626 345/173 |
| 2016/0212872 A1* | 7/2016 | Pakula | G06F 1/1626 |
| 2016/0277057 A1* | 9/2016 | Takahashi | H01H 13/06 |

* cited by examiner

TRANSPARENT COMPOSITE SUBSTRATE, PREPARATION METHOD THEREOF AND TOUCH PANEL

BACKGROUND OF THE INVENTION

This application claims priority to Chinese Application Serial Number 201410562579.0, filed Oct. 21, 2014, which is herein incorporated by reference.

FIELD OF THE INVENTION

The present disclosure relates to transparent composite substrates. More particularly, the present disclosure relates to transparent composite substrates having a binding layer, preparation methods thereof, and applications thereof to touch panels.

DESCRIPTION OF RELATED ART

Sapphire substrates have excellent abrasion and scratch resistance, and Moh's hardness of sapphire substrates is about 9, which is only below that of diamond. Also, sapphire substrates have larger surface tension due to high compactness. The two characteristics mentioned above make sapphire substrates suitable for the preparation of touch panels of electronic devices. Although applications of sapphire substrates are gaining popularity, costs associated with sapphire substrates are much higher and make it difficult to achieve wide application and promotion. In addition, although sapphire substrates have higher hardness, sapphire substrates also have low compression resistance, high brittleness and low impact resistance, which limit application of sapphire substrates.

Common composite substrates are formed by a composite of sapphire substrates and glass substrates to take advantage of the abrasion and scratch resistance of sapphire substrates, while using glass substrates to further increase the compression and impact resistance of the composite substrate. Generally, an adhesive is used to bond a sapphire substrate to a glass substrate. However, the adhesive has poor transparency and adhesion, and may lose the adhesive property at high temperature and pressure. The adhesive further increases thickness of the composite substrate.

SUMMARY OF THE INVENTION

The present disclosure provides a transparent composite substrate using a binding layer to achieve a composite of the glass substrate and the sapphire substrate without using any adhesives.

The present disclosure provides a transparent composite substrate. The transparent composite substrate includes a first transparent substrate, a second transparent substrate, and a binding layer bonding the first transparent substrate and the second transparent substrate with a bond therebetween.

In one or some embodiments of the present disclosure, the binding layer includes silicon-oxygen-silicon bonds, aluminum-oxygen-silicon bonds or aluminum-oxygen-aluminum bonds.

In one or some embodiments of the present disclosure, the first transparent substrate and the second transparent substrate are independently selected from a glass substrate or a sapphire substrate.

In one or some embodiments of the present disclosure, the first transparent substrate is the sapphire substrate, and the second transparent substrate is the glass substrate.

In one or some embodiments of the present disclosure, an inorganic material layer is disposed between the binding layer and the sapphire substrate, and the binding layer has silicon-oxygen-silicon bonds.

In one or some embodiments of the present disclosure, the inorganic material layer is a silicon layer or a silicon dioxide layer.

In one or some embodiments of the present disclosure, the inorganic material layer has a thickness in a range from about 1 μm to about 10 μm.

In one or some embodiments of the present disclosure, the sapphire substrate has a thickness in a range from about 0.1 mm to about 0.3 mm, and the glass substrate has a thickness in a range from about 0.2 mm to about 1 mm.

The present disclosure provides a method of manufacturing a transparent composite substrate. The method includes following steps. A first transparent substrate and a second transparent substrate are provided, and surfaces of the first transparent substrate and the second transparent substrate are activated to adsorb a hydroxyl group thereon. The activated surfaces of the first transparent substrate and the second transparent substrate are overlapped to form a contact surface therebetween, and the first transparent substrate and the second transparent substrate are annealed to form a binding layer at the contact surface.

In one or some embodiments of the present disclosure, the surfaces of the first transparent substrate and the second transparent substrate are activated by a plasma gas comprising nitrogen gas, argon gas, neon gas, or combination thereof.

In various embodiments of the present disclosure, the first transparent substrate and the second transparent substrate are annealed between 0° C. and 1000° C.

The present disclosure provides a method of manufacturing a transparent composite substrate. The method includes following steps. A sapphire substrate and a glass substrate are provided, and an inorganic material layer is formed at a bottom surface of the sapphire substrate. Then, the sapphire substrate and the glass substrate are stacked to form a contact surface between the inorganic material layer and the glass substrate, and an electrical field is applied to the sapphire substrate and the glass substrate, which the sapphire substrate is connected to an anode of the electrical field, and the glass substrate is connected to an cathode of the electrical field. The sapphire substrate and the glass substrate are heated to form a binding layer at the contact surface.

In one or some embodiments of the present disclosure, the inorganic material layer is a silicon layer or a silicon dioxide layer.

In one or some embodiments of the present disclosure, the electrical field has a voltage in a range from about 300 V to about 800 V, and a heating temperature is in a range from about 200° C. to about 400° C.

The present disclosure provides a touch panel. The touch panel includes a transparent composite substrate and a touch sensing device. The transparent composite substrate acts as a cover plate of the touch panel, which the transparent composite substrate includes a first transparent substrate, a second transparent substrate, and a binding layer bonding the first transparent substrate and the second transparent substrate with a bond therebetween. The touch sensing device is disposed at the second transparent substrate, which the touch sensing device and the binding layer are at two opposite sides of the second transparent substrate respectively.

In one or some embodiments of the present disclosure, the first transparent substrate is a sapphire substrate, and the second transparent substrate is a glass substrate.

In one or some embodiments of the present disclosure, an anti-reflective film is disposed at the first transparent substrate, which the anti-reflective film and the binding layer are at two opposite sides of the first transparent substrate respectively.

BRIEF DESCRIPTION OF THE DRAWINGS

The embodiments can be more fully understood by reading the following detailed description, with reference made to the accompanying drawings as follows.

DETAILED DESCRIPTION OF THE INVENTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figure 1:
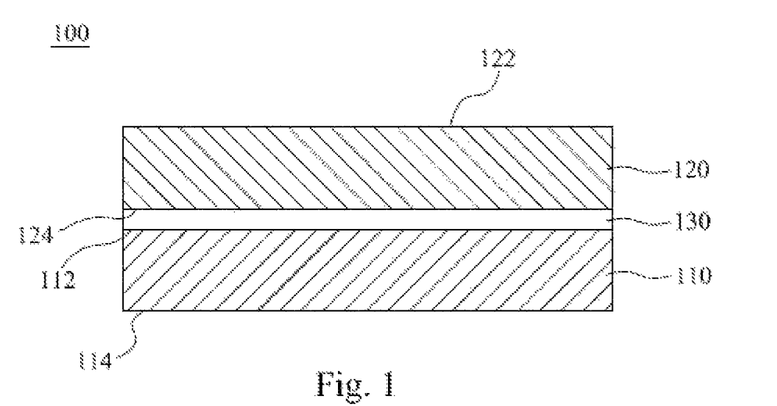
FIG. 1 illustrates a cross-sectional view of a transparent composite substrate according to various embodiments of the present disclosure.

FIG. 1 illustrates a cross-sectional view of a transparent composite substrate 100 according to various embodiments of the present disclosure. As shown in FIG. 1, the transparent composite substrate 100 includes a glass substrate 110, a sapphire substrate 120, and a binding layer 130 disposed between the glass substrate 110 and the sapphire substrate 120 to bond the glass substrate 110 and the sapphire substrate 120. The bonding means that a bond is formed between the glass substrate 110 and the sapphire substrate 120, so as to achieve a stable and strong composite of the glass substrate 110 and the sapphire substrate 120.

Specifically, the glass substrate 110 includes an upper surface 112 and a lower surface 114, and the sapphire substrate 120 also includes an upper surface 122 and a lower surface 124. The glass substrate 110 is formed of silicon dioxide with some sodium ions, potassium ions, and calcium ions therein, and the sapphire substrate 120 is formed of aluminum oxide.

During the bonding process, a surface treatment is performed on the surfaces predetermined for bonding. In some embodiments, the surface treatment is performed to the lower surface 124 of the sapphire substrate 120 and the upper surface 112 of the glass substrate 110, to make the lower surface 124 and the upper surface 112 hydrophilic and have valence bonds. Specifically, the hydrophilic lower surface 124 of the sapphire substrate 120 and the hydrophilic upper surface 112 of the glass substrate 110 adsorb hydroxyl groups, which react with silicon in the glass substrate 110 to form silanol bonds (Si—OH). Similarly, the hydroxyl groups also react with aluminum in the sapphire substrate 120 to form aluminum alcohol bonds (Al—OH).

The lower surface 124 of the sapphire substrate 120 and the upper surface 112 of the glass substrate 110 are overlapped to form a contact surface therebetween. Then, an annealing process is performed on the sapphire substrate 120 and the glass substrate 110 to polymerize silanol bonds and aluminium alcohol bonds at high temperature, and the binding layer 130 is formed with aluminum-oxygen-silicon bonds (Al—O—Si) therein to achieve stable composite of the sapphire substrate 120 and the glass substrate 110. A thickness of the binding layer 130 is very thin, which is less than or equal to about 10 nm.

In some embodiments, the sapphire substrate 120 has a thickness in a range from about 0.1 mm to about 0.3 mm, and the glass substrate 110 has a thickness in a range from about 0.2 mm to about 1 mm. The glass substrate 110 may be, for example, a substrate through chemical strengthening, which has better strength to improve the sapphire substrate 120 with thinner thickness and lower compression resistance.

Figure 2:
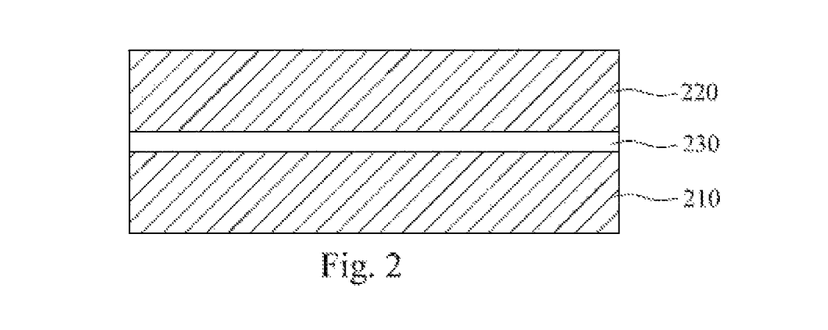
FIG. 2 illustrates a cross-sectional view of a transparent composite substrate according to various embodiments of the present disclosure.

FIG. 2 illustrates a cross-sectional view of a transparent composite substrate 200 according to various embodiments of the present disclosure. As shown in FIG. 2, the transparent composite substrate 200 includes a first glass substrate 210, a second glass substrate 220, and a binding layer 230 disposed between the first glass substrate 210 and the second glass substrate 220, so as to bond the first glass substrate 210 and the second glass substrate 220. In some embodiments, the binding layer 230 includes silicon-oxygen-silicon bonds (Si—O—Si).

Figure 3:
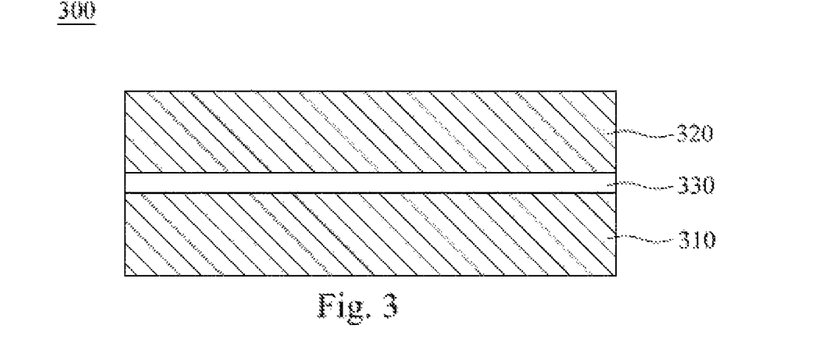
FIG. 3 illustrates a cross-sectional view of a transparent composite substrate according to various embodiments of the present disclosure.

FIG. 3 illustrates a cross-sectional view of a transparent composite substrate according to various embodiments of the present disclosure. As shown in FIG. 3, a transparent composite substrate 300 includes a first sapphire substrate 310, a second sapphire substrate 320, and a binding layer 330 disposed between the first sapphire substrate 310 and the second sapphire substrate 320, so as to bond the first sapphire substrate 310 and the second sapphire substrate 320. In some embodiments, the binding layer 330 includes aluminum-oxygen-aluminum bonds (Al—O—Al).

As described with regard to the above embodiments, the binding layer 130 is formed between the sapphire substrate 120 and the glass substrate 110, so as to achieve the composite of the two by bonding without using any adhesives, but not limited thereto. Similarly, the binding layer 230 or 330 is formed between two glass substrate 210 and 220 or between two sapphire substrate 310 and 320 to achieve stable bonding therebetween. In addition, in various embodiments, the binding layer 130 can be used to achieve stable bonding between a plurality of substrates. For example, a transparent composite substrate is a multi-layer composite substrate including, from top to bottom, the glass substrate 110, the binding layer 130, the sapphire substrate 120, another binding layer 130 and another glass substrate 110 in that sequence to increase the strength of a touch panel.

Figure 4:
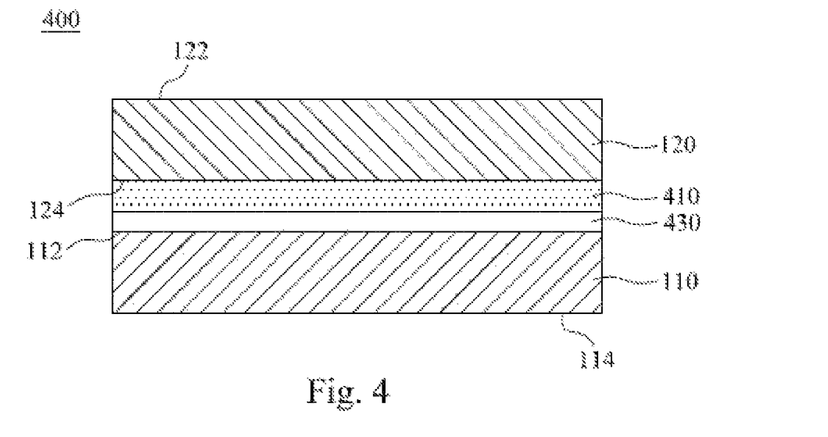
FIG. 4 illustrates a cross-sectional view of a transparent composite substrate according to various embodiments of the present disclosure.

FIG. 4 illustrates a cross-sectional view of a transparent composite substrate according to various embodiments of the present disclosure. FIG. 4 and FIG. 1 use the same reference numerals to represent the same or like elements, and the description of the same portions is omitted. Description of the omitted portions can be found above, and the details are not repeated hereinafter.

As shown in FIG. 4, a transparent composite substrate 400 includes the glass substrate 110, the sapphire substrate 120, and a binding layer 430 disposed between the glass substrate 110 and the sapphire substrate 120, so as to bond the glass substrate 110 and the sapphire substrate 120. In addition, the transparent composite substrate 400 further includes an inorganic material layer 410 disposed between the binding layer 430 and the sapphire substrate 120. The inorganic material layer 410 is a silicon layer or a silicon dioxide layer to achieve higher bonding strength between the glass substrate 110 and the sapphire substrate 120.

The transparent composite substrate 400 is formed by an electrochemical reaction process using an external electric field. For example, the upper surface 122 of the sapphire substrate 120 is connected to an anode of the external electric field, and the lower surface 112 of the glass substrate 110 is connected to a cathode of the external electric field. Alkali metal ions in the glass substrate 110, such as sodium, potassium and calcium ions, migrate toward the cathode and aggregate at the lower surface 114 of the glass substrate 110. Therefore, a depletion region having negative charges is formed at the upper surface 112 of the glass substrate 110 adjacent to the inorganic material layer 410. A huge electrostatic attraction force is formed between the depletion region having negative charges and the inorganic material layer 410 having positive charges to make the glass substrate 110 bond to the sapphire substrate 120 via the inorganic material layer 410. In addition, oxygen ions remain at the upper surface 112 of the glass substrate 110 due to the migration of the alkali metal ions. At high temperature, these oxygen ions further react with silicon inside the inorganic material layer 410 to form stable silicon-oxygen-silicon bonds (Si—O—Si) in the binding layer 430. The binding layer 430 should include sufficient silicon-oxygen-silicon bonds to achieve stable and solid bonding.

In some embodiments, the inorganic material layer 410 is a silicon layer having a thickness in a range from about 1 μm to about 10 μm. In various embodiments, the inorganic material layer 410 is a silicon dioxide layer having a thickness in a range from about 1 μm to about 10 μm.

Figure 5:
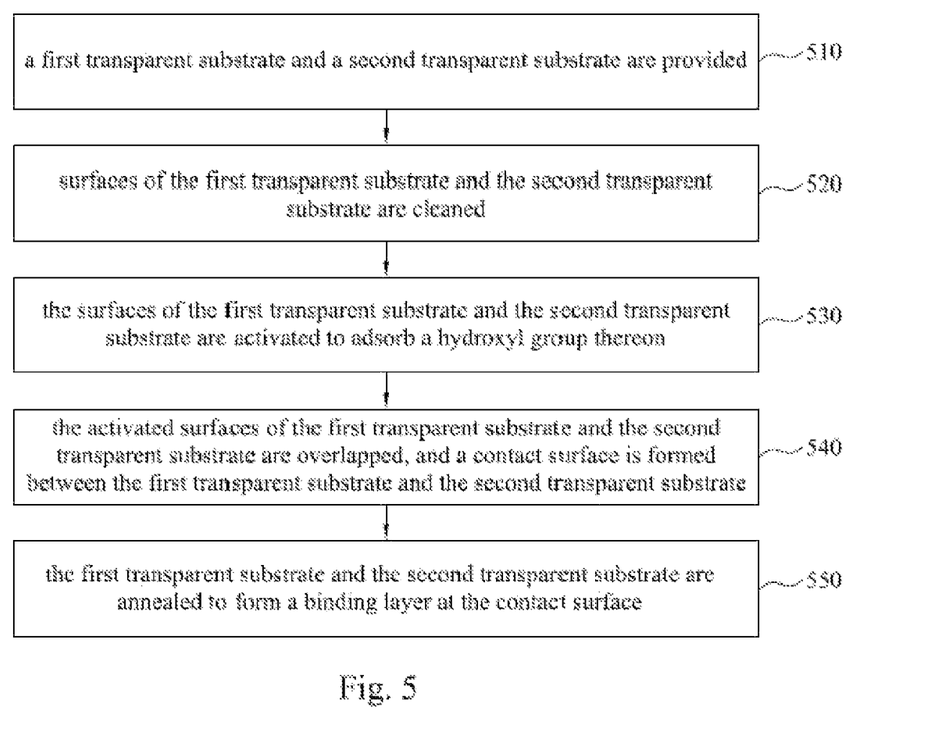
FIG. 5 is a flow chart illustrating a method of manufacturing a transparent composite substrate, according to various embodiments of the present disclosure.

FIG. 5 is a flow chart illustrating a method of manufacturing a transparent composite substrate, according to various embodiments of the present disclosure. The method starts with step 510, in which a first transparent substrate and a second transparent substrate are provided. In some embodiments, the first transparent substrate is the glass substrate 110, and the second transparent substrate is the sapphire substrate 120 to manufacture the transparent composite substrate 100 shown in FIG. 1. In various embodiments, the first transparent substrate and the second transparent substrate are the glass substrate 210 and 220 to manufacture the transparent composite substrate 200 shown in FIG. 2. In various embodiments, the first transparent substrate and the second transparent substrate are the sapphire substrates 310 and 320 to manufacture the transparent composite substrate 300 shown in FIG. 3.

Continuing in step 520, the surfaces of the first transparent substrate and the second transparent substrate are cleaned. Because the cleanness of the bonding surfaces will influence the bonding strength, dust and particles on the surfaces of the first transparent substrate and the second transparent substrate are cleaned away with water, alcohol, acetone, or a combination thereof before bonding. In addition, the flatness of the bonding surfaces also influences the bonding strength. The surfaces of the first transparent substrate and the second transparent substrate are polished before cleaning, so as to obtain flat and smooth surfaces.

Referring to step 530, the surfaces of the first transparent substrate and the second transparent substrate are activated to adsorb a hydroxyl group thereon. A plasma gas, such as nitrogen gas, argon gas, and neon gas, generates ions or neutral atoms at high temperature and high energy, and these ions or neutral atoms physically impact the surfaces of first transparent substrate and the second transparent substrate. Therefore, the surfaces predetermined for bonding adsorb the hydroxyl groups thereon. As illustrated in FIG. 1, some unstable oxygen atoms are on the surfaces or in vivo of the glass substrate 110 and the sapphire substrate 120. Under certain conditions, these unstable oxygen atoms are activated to leave silicon atoms and aluminum atoms, and dangling bonds are formed at the surfaces. In FIG. 1, the upper surface 112 of the glass substrate 110 and the bottom surface 124 of the sapphire substrate 120 are activated by the plasma gas to form hydrophilic lower surface 124 and hydrophilic upper surface 112. The hydrophilic lower surface 124 of the sapphire substrate 120 and the hydrophilic upper surface 112 of the glass substrate 110 are able to adsorb hydroxyl groups, so as to form the silanol bonds (Si—OH) and the aluminium alcohol bonds (Al—OH). In some embodiments, the plasma gas is a low-temperature plasma gas. In various embodiments, the plasma gas is in a vacuum environment to increase efficiency of the process.

Continuing in step 540, the activated surfaces of the first transparent substrate and the second transparent substrate are overlapped, and a contact surface is formed between the first transparent substrate and the second transparent substrate. Referring to FIG. 1 at the same time, the activated upper surface 112 of the glass substrate 110 and the activated lower surface 124 of the sapphire substrate 120 are stacked to form the contact surface between the glass substrate 110 and the sapphire substrate 120. Because the upper surface 112 and the lower surface 124 are hydrophilic, water molecules can be easily adsorbed thereon, and a hydrogen bonding bridge is formed at the contact surface to attract the upper surface 112 and the lower surface 124. The bonding strength of the hydrogen bonding bridge is stronger than a van der Waals force between atoms, so an initial bonding is much easier to be achieved.

Continuing in step 550, the first transparent substrate and the second transparent substrate are annealed to form a binding layer at the contact surface. After initial bonding, the glass substrate 110 and the sapphire substrate 120 are heated in an atmosphere furnace to perform an annealing process. During the annealing process, the hydrogen bonds between the upper surface 112 and the lower surface 124 disappear, and oxygen bonds (—O—O— or —O—) are formed to shorten the space between the atoms at the contact surface. At the same time, the silanol bonds at the upper surface 112 of the glass substrate 110 are polymerized with the aluminum alcohol bonds at the lower surface 124 of the sapphire substrate 120, and the binding layer 130 having silicon-oxygen-aluminum bonds is formed at the contact surface to achieve stable composite of the glass substrate 110 and the sapphire substrate 120.

It is worth noting that the flow chart shown in FIG. 5 is not limited to manufacture of the transparent composite substrates shown in FIG. 1 to FIG. 3, but could be also used to manufacture the transparent composite substrate shown in FIG. 4. For example, the inorganic material layer 410 is coated on the lower surface 124 of the sapphire substrate 120, and steps of cleaning, activating, stacking and annealing are performed to form the binding layer 430 between the sapphire substrate 120 and the glass substrate 110. In some embodiments, the binding layer 430 includes silicon-oxygen-silicon bonds (Si—O—Si) to achieve a stable composite of the glass substrate 110 and the sapphire substrate 120.

Figure 6:
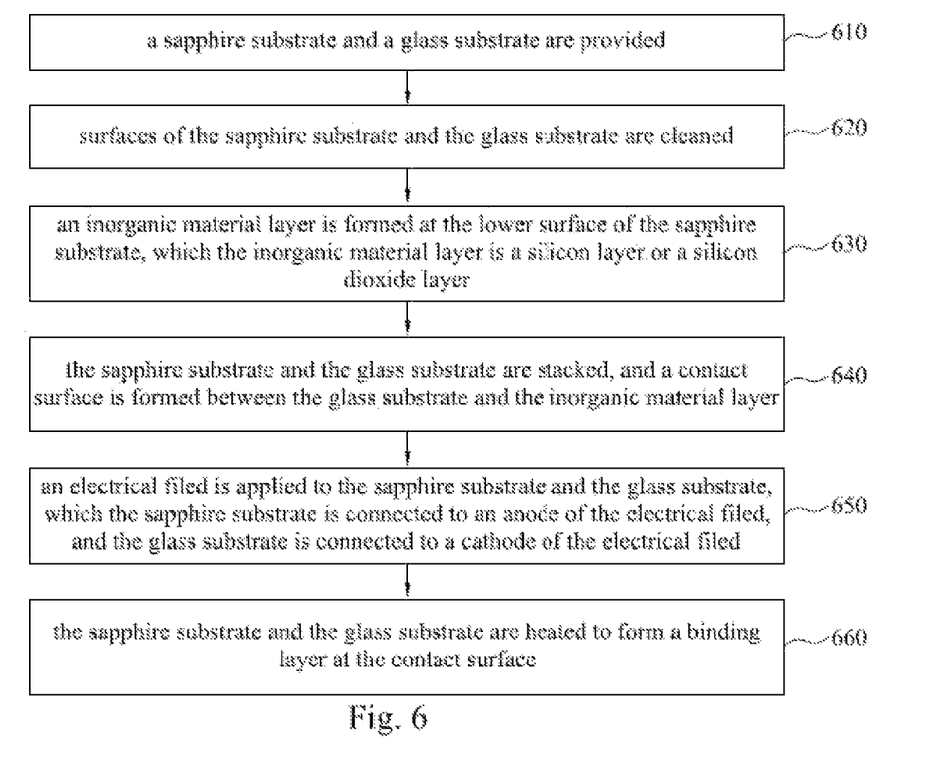
FIG. 6 is a flow chart illustrating a method of manufacturing a transparent composite substrate, according to various embodiments of the present disclosure.

FIG. 6 is a flow chart illustrating a method of manufacturing a transparent composite substrate according to various embodiments of the present disclosure. Please refer to FIG. 6 and the transparent composite substrate 400 shown in FIG. 4 at the same time. The method starts with step 610, in which a sapphire substrate 120 and a glass substrate 110 are provided to manufacture the transparent composite substrate 400 shown in FIG. 4.

Continuing in step 620, the surfaces of the sapphire substrate 120 and the glass substrate 110 are cleaned. Because the cleanness of the bonding surfaces will influence the bonding strength, dusts and particles on the surfaces of the sapphire substrate 120 and the glass substrate 110 are cleaned away with water, alcohol, acetone, or combination thereof before bonding. In addition, the flatness of the bonding surfaces also influences the bonding strength. The surfaces of the sapphire substrate 120 and the glass substrate 110 are polished before cleaning, so as to obtain flat and smooth surfaces.

Referring to step 630, an inorganic material layer 410 is formed at the lower surface 124 of the sapphire substrate 120. The inorganic material layer 410 is a silicon layer or a silicon dioxide layer. As shown in FIG. 4, the inorganic material layer 410 is formed at the lower surface 124 of the sapphire substrate 120 and in contact with the sapphire substrate 120. In some embodiments, the inorganic material layer 410 is formed by coating. In some embodiments, the inorganic material layer 410 is a silicon layer having a thickness in a range from about 1 μm to about 10 μm. In various embodiments, the inorganic material layer 410 is a silicon dioxide layer having a thickness in a range from about 1 μm to about 10 μm.

Continuing in step 640, the sapphire substrate 120 and the glass substrate 110 are stacked, and a contact surface is formed between the glass substrate 110 and the inorganic material layer 410. Referring to FIG. 4 at the same time, the glass substrate 110 is stacked with the sapphire substrate 120 having the inorganic material layer 410 at the lower surface 124 to form the contact surface between the inorganic material layer 410 and the glass substrate 110.

Continuing in step 650, an electrical field is applied to the sapphire substrate 120 and the glass substrate 110. The sapphire substrate 120 is connected to an anode of the electrical field, and the glass substrate 110 is connected to a cathode of the electrical field. After stacking, the glass substrate 110 and the sapphire substrate 120 are placed in a bonding machine for bonding. The bonding machine generates the electrical field applied to the sapphire substrate 120 and the glass substrate 110. The top surface 122 of the sapphire substrate 120 is connected to the anode of the electrical field, and the bottom surface 114 of the sapphire substrate 120 is connected to a cathode of the electrical field. While applying the electrical field, a huge current pulse is generated. When the current pulse is gradually decreased to zero, the bonding process is completed. In some embodiments, the electrical field has a voltage in a range from about 300 V to about 800 V.

Ions in the glass substrate 110 migrate due to the electrical field. Specifically, the alkali metal ions in the glass substrate, such as sodium, potassium and calcium ions, migrate toward the cathode and aggregate at the bottom surface 114 of the glass substrate 110. Therefore, the depletion region having negative charges is formed at the top surface 112 of the glass substrate 110 adjacent to the inorganic material layer 410. A huge electrostatic attraction force is formed between the depletion region and the inorganic material layer 410 having positive charges to make the glass substrate 110 bond stably to the sapphire substrate 120.

Continuing in step 660, the sapphire substrate 120 and the glass substrate 110 are heated to form the binding layer 430 at the contact surface. The bonding process is performed at high temperature, about 200° C. to 400° C., to assist the electrostatic attraction force, and the bonding strength is further increased. In addition, oxygen ions remain at the top surface 112 of the glass substrate 110 due to the migration of the alkali metal ions. These oxygen ions react with silicon inside the inorganic material layer 410 at high temperature to form stable silicon-oxygen-silicon bonds (Si—O—Si) in the binding layer 430 to achieve a stable composite of the glass substrate 110 and the sapphire substrate 120.

Figure 7A:
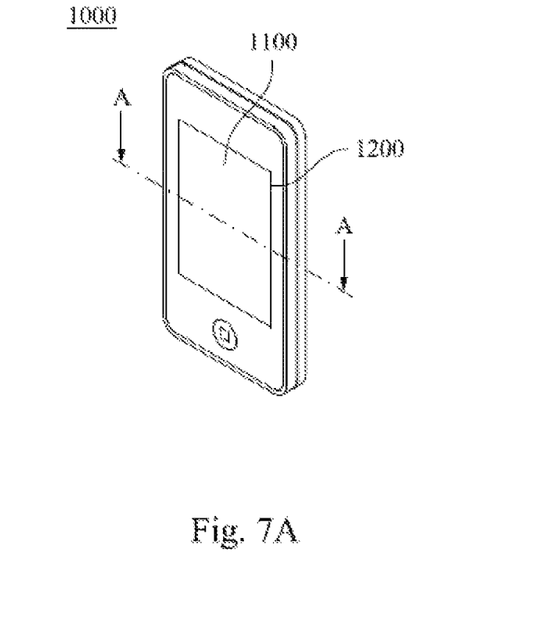
FIG. 7A is a three dimensional diagram of a touch panel according to various embodiments of the present disclosure.
Figure 7B:
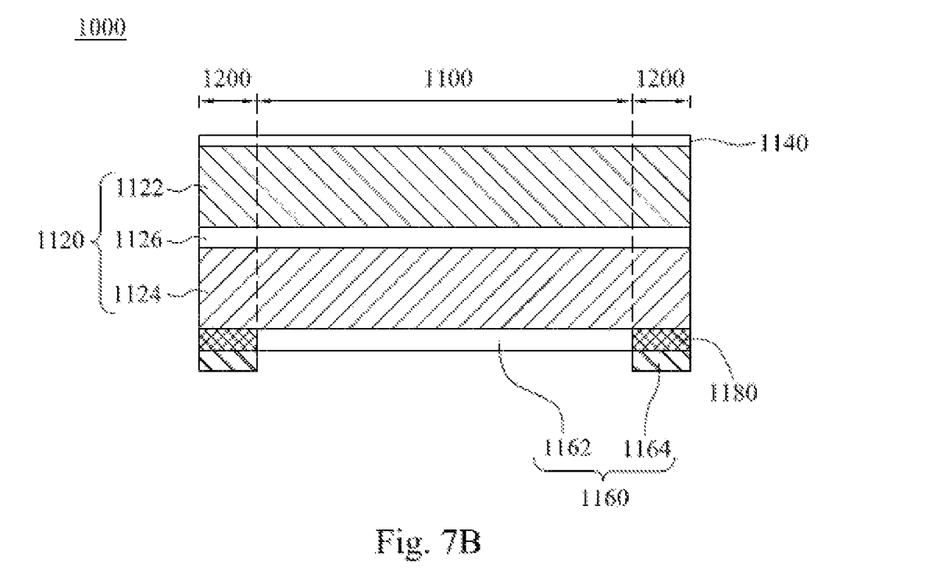
FIG. 7B is a cross-sectional view of a portion of the touch panel in FIG. 7A along line A-A, according to various embodiments of the present disclosure.

The transparent composite substrate in the present disclosure can act as a cover plate of a touch panel. Please refer to FIGS. 7A and 7B for further clarification of the present disclosure. FIG. 7A illustrates a three-dimensional diagram of a touch panel according to various embodiments of the present disclosure, and FIG. 7B illustrates a cross-sectional view of a portion of the touch panel in FIG. 7A along line A-A, according to various embodiments of the present disclosure. As shown in FIG. 7A, a touch panel 1000 includes a touch region 1100 and a non-touch region 1200 surrounding the touch region 1100. The touch region 1100 is a display area of the touch panel 1000, and the non-touch region 1200 is a non-viewing area of the touch panel 1000. Generally, a frame is formed by a light-shielding layer to cover the non-touch region 1200. In FIG. 7B, the touch panel 1000 includes a cover plate 1120, which is the transparent composite substrate described above. The cover plate 1120 includes a first transparent substrate 1122, a second transparent substrate 1124, and a binding layer 1126 bonding the first transparent substrate 1122 and the second transparent substrate 1124 with a bond therebetween.

To increase transmittance of the touch panel 1000, an anti-reflective film 1140 is disposed on the first transparent substrate 1122. The anti-reflective film 1140 and the binding layer 1126 are respectively at two opposite sides of the first transparent substrate 1122 to increase the transmittance. The anti-reflective film 1140 may be a single-layer or multi-layer transparent film having functionality of anti-reflective or anti-glare. On the other hand, a touch sensing device 1160 is disposed at the second transparent substrate 1124, which the touch sensing device 1160 and the binding layer 1126 are respectively at two opposite sides of the second transparent substrate 1124.

The touch sensing device 1160 includes a sensing electrode layer 1162 and a wire layer 1164. The sensing electrode layer 1162 is disposed in the touch region 1100, and the wire layer 1164 is disposed in the non-touch region 1200, which the sensing electrode layer 1162 is extended to the non-touch region 1200 to electrically connect the wire layer 1164. The sensing electrode layer 1162 is formed of transparent conductive material, such as indium tin oxide (ITO), indium zinc oxide (IZO), cadmium tin oxide (CTO), aluminum zinc oxide (AZO), indium tin zinc oxide (ITZO), graphene, Ag nanowire, or carbon nanotubes (CNT), but not limited thereto. The wire layer 1164 is formed of transparent conductive material the same as the sensing electrode layer 1162, or opaque conductive material, such as Ag, Cu, Mo, Al, and other suitable metals and alloys. The sensing electrode layer 1162 and the wire layer 1164 may be formed on the second transparent substrate 1124 by printing and laser etching, or sputtering and photolithography etching. The sensing electrode layer 1162 generates signals when sensing touching, and the wire layer 1164 transfers the signals to a processor to calculate the location of touching. In addition, the sensing electrode layer 1162 is not limited to be directly formed at the second transparent substrate 1124. In various embodiments, the sensing electrode layer 1162 is adhered to the second transparent substrate 1124 by adhesive material.

The touch panel 1000 further includes a light-shielding layer 1180 disposed on the second transparent substrate 1124, which the light-shielding layer 1180 and the and the binding layer 1126 are respectively at two opposite sides of the second transparent substrate 1124. The light-shielding layer 1180 is disposed in the non-touch region 1200 and between the second transparent substrate 1124 and the wire layer 1164, so as to shield the wire layer 1164 and other opaque devices in the non-touch region 1200. The light-shielding layer 1180 is formed of opaque materials, such as ink and photoresist, which the ink is formed on the second transparent substrate 1124 by printing, and the photoresist is formed on the second transparent substrate 1124 by photolithography etching.

In some embodiments, the first transparent substrate 1122 is the sapphire substrate, and the second transparent substrate 1124 is the glass substrate. It is worth noting that the sapphire substrate acts as a touching surface to make the touch panel 1000 have the scratch resistance of the sapphire substrate and the strength of the glass substrate. Specifically, users operate programs and give instructions by touching the sapphire substrate. In some embodiments, the sapphire is directly bonded to the glass substrate to form the binding layer 1126 having silicon-oxygen-aluminum bonds at the contact surface. In various embodiments, the inorganic material layer is coated on the sapphire substrate, and then the sapphire substrate is bonded to the glass substrate to form the binding layer 1126 having silicon-oxygen-silicon bonds between the glass substrate and the inorganic material layer.

The embodiments of the present disclosure discussed above have advantages over existing structures and methods, and the advantages are summarized below. The transparent composite substrate is formed by the composite of the sapphire substrate and the glass substrate to significantly reduce the costs of the sapphire substrate. Also, the glass substrate increases the compression resistance of the sapphire substrate to overcome the sapphire substrate's drawback of being brittle. Most importantly, the glass substrate and the sapphire substrate are bonded via the binding layer without any adhesives, so the thinner transparent composite substrate could be formed with excellent transparency. In addition, the bonding strength between the glass substrate and the sapphire substrate is strong enough to maintain stable and solid bonding at high temperature and pressure, and thereby being widely applied to the touch device.

Although the present invention has been described in considerable detail with reference to certain embodiments thereof, other embodiments are possible. Therefore, the spirit and scope of the appended claims should not be limited to the description of the embodiments contained herein. Reference will now be made in detail to the embodiments of the invention, examples of which are illustrated in the accompanying drawings. Wherever possible, the same reference numbers are used in the drawings and the description to refer to the same or like parts.

What is claimed is:

1. A transparent composite substrate, comprising:
   a first transparent substrate;
   a second transparent substrate; and
   a binding layer bonding the first transparent substrate and the second transparent substrate with a bond therebetween,
   wherein the binding layer comprises aluminum-oxygen-silicon bonds or aluminum-oxygen-aluminum bonds,
   wherein the binding layer is formed by:
      performing a surface treatment on predetermined surfaces of the first transparent substrate and the second transparent substrate to activate the predetermined surfaces so that the predetermined surfaces are hydrophilic, have valence bonds, and absorb hydroxyl groups;
      overlapping the predetermined surfaces to form a contact surface therebetween, wherein a hydrogen bonding bridge is formed at the contact surface to attract the predetermined surfaces; and
      performing an annealing process to polymerize silanol bonds and/or aluminum alcohol bonds, cause hydrogen bonds to disappear, and form oxygen bonds to shorten a space between atoms at the contact surface,
   wherein the transparent composite substrate comprises a touch region and a non-touch region surrounding the touch region,
   wherein a light-shielding layer is disposed on the second transparent substrate, opposite the binding layer, and in the non-touch region,
   wherein a sensing electrode layer is disposed on the second transparent substrate, opposite the binding layer, in the touch region and extends into the non-touch region, and
   wherein a wire layer is disposed on the light-shielding layer and is electrically connected to the sensing electrode layer that extends into the non-touch region.

2. The transparent composite substrate of claim 1, wherein the first transparent substrate and the second transparent substrate are independently selected from a glass substrate or a sapphire substrate.

3. The transparent composite substrate of claim 2, wherein the first transparent substrate is the sapphire substrate and the second transparent substrate is the glass substrate.

4. The transparent composite substrate of claim 3, wherein the sapphire substrate has a thickness in a range from about 0.1 mm to about 0.3 mm and the glass substrate has a thickness in a range from about 0.2 mm to about 1 mm.

5. The transparent composite substrate of claim 1, wherein the binding layer comprises aluminum-oxygen-silicon bonds, aluminum of the aluminum-oxygen-silicon bonds is aluminum of the first transparent substrate, and silicon of the aluminum-oxygen-silicon bonds is silicon of the second transparent substrate.

6. The transparent composite substrate of claim 1, wherein the binding layer comprises aluminum-oxygen-aluminum bonds, some aluminum of the aluminum-oxygen-aluminum bonds is derived from aluminum of the first transparent substrate, and some aluminum of the aluminum-oxygen-aluminum bonds is derived from aluminum of the second transparent substrate.

7. A touch panel, comprising:
   a transparent composite substrate as a cover plate of the touch panel and having a touch region and a non-touch region, the transparent composite substrate comprising:
      a first transparent substrate;
      a second transparent substrate; and
      a binding layer bonding the first transparent substrate and the second transparent substrate with a bond therebetween,
      wherein the binding layer comprises aluminum-oxygen-silicon bonds or aluminum-oxygen-aluminum bonds;
      wherein the binding layer is formed by:
         performing a surface treatment on predetermined surfaces of the first transparent substrate and the second transparent substrate to activate the predetermined surfaces so that they are hydrophilic, have valence bonds, and absorb hydroxyl groups;
         overlapping the predetermined surfaces to form a contact surface therebetween, wherein a hydrogen bonding bridge is formed at the contact surface to attract the predetermined surfaces; and
         performing an annealing process to polymerize silanol bonds and/or aluminum alcohol bonds, cause hydrogen bonds to disappear, and form oxygen bonds to shorten a space between atoms at the contact surface;
   a touch sensing device disposed at the second transparent substrate in both the touch region and the non-touch region; and
   a light-shielding layer disposed on the second transparent substrate,
   wherein the touch sensing device and the binding layer are at opposite sides of the second transparent substrate,
   wherein the light-shielding layer and the binding layer are at opposite sides of the second transparent substrate, and
   wherein the touch sensing device comprises:
      a sensing electrode layer in the touch region and extending into the non-touch region; and
      a wire layer disposed on the light-shielding layer and electrically connected to the sensing electrode layer that extends into the non-touch region.

8. The touch panel of claim 7, wherein the first transparent substrate is a sapphire substrate and the second transparent substrate is a glass substrate.

9. The touch panel of claim 8, further comprising an anti-reflective film disposed at the first transparent substrate, wherein the anti-reflective film and the binding layer are at opposite sides of the first transparent substrate.

10. The touch panel of claim 7, wherein the binding layer comprises aluminum-oxygen-silicon bonds, aluminum of the aluminum-oxygen-silicon bonds is aluminum of the first transparent substrate, and silicon of the aluminum-oxygen-silicon bonds is silicon of the second transparent substrate.

11. The touch panel of claim 7, wherein the binding layer comprises aluminum-oxygen-aluminum bonds, some aluminum of the aluminum-oxygen-aluminum bonds is derived from aluminum of the first transparent substrate, and some aluminum of the aluminum-oxygen-aluminum bonds is derived aluminum from aluminum of the second transparent substrate.

* * * * *